US008350148B1

(12) United States Patent  (10) Patent No.: US 8,350,148 B1
Shotey et al.                (45) Date of Patent:    Jan. 8, 2013

(54) ELECTRICAL BOX WITH MOVABLE MOUNTING STRUCTURES

(75) Inventors: Marcus J. Shotey, Scottsdale, AZ (US);
Jeffrey P. Baldwin, Phoenix, AZ (US);
Richard L. Cleghorn, Tempe, AZ (US);
John Klein, Gilbert, AZ (US)

(73) Assignee: Hubbell Incorporated, Shelton, CT (US)

( * ) Notice: Subject to any disclaimer, the term of this patent is extended or adjusted under 35 U.S.C. 154(b) by 173 days.

(21) Appl. No.: 12/792,694

(22) Filed: Jun. 2, 2010

Related U.S. Application Data

(60) Provisional application No. 61/183,262, filed on Jun. 2, 2009.

(51) Int. Cl.
*H05K 5/00* (2006.01)
(52) U.S. Cl. .............. 174/50; 439/535; 248/906
(58) Field of Classification Search ............ 174/50, 174/58; 439/535; 248/906; 220/4.02
See application file for complete search history.

(56) References Cited

U.S. PATENT DOCUMENTS

| | | | | |
|---|---|---|---|---|
| 1,265,744 A * | 5/1918 | Canfield | ......... | 174/58 |
| 2,378,861 A * | 6/1945 | Peevey | ......... | 220/8 |
| RE28,489 E * | 7/1975 | Schindler et al. | ......... | 174/58 |
| 4,634,015 A * | 1/1987 | Taylor | ......... | 220/3.7 |
| 7,075,004 B1 * | 7/2006 | Gretz | ......... | 174/50 |
| 7,098,399 B1 * | 8/2006 | Gretz et al. | ......... | 174/58 |
| 7,179,994 B2 * | 2/2007 | Elberson | ......... | 174/58 |
| 7,351,910 B1 * | 4/2008 | Magisano et al. | ......... | 174/58 |
| 7,378,590 B1 * | 5/2008 | Herth | ......... | 174/50 |
| 7,488,891 B1 * | 2/2009 | Gretz | ......... | 174/58 |
| 7,563,978 B2 * | 7/2009 | Lalancette et al. | ......... | 174/58 |
| 7,572,978 B1 * | 8/2009 | Keith, Jr. | ......... | 174/58 |
| 7,576,284 B2 * | 8/2009 | Dinh | ......... | 174/50 |
| 7,939,755 B1 * | 5/2011 | Sapio | ......... | 174/58 |

* cited by examiner

*Primary Examiner* — Dhirubhai R Patel
(74) *Attorney, Agent, or Firm* — Booth Udall, PLC

(57) ABSTRACT

An electrical box comprises a back wall and opposing top and bottom walls. Coupled to a top wall is a track that is configured to interface with a wall mount feature (such as a nail boss) in such a manner that the wall mount features can slide within the track. In such a manner, the wall mount features can be placed in a forward position for storage or transportation, and in a rearward position when installed in a wall. The forward position of the wall mounting feature allows electrical boxes to be nested within each other, raising the shipping density of electrical boxes that can be stored.

7 Claims, 4 Drawing Sheets

US 8,350,148 B1

ELECTRICAL BOX WITH MOVABLE MOUNTING STRUCTURES

CROSS REFERENCE TO RELATED APPLICATIONS

This application claims the benefit of the filing date of U.S. Provisional Patent Application 61/183,262 entitled "Electrical Box with Movable Mounting Provisions" to Marcus Shotey, et al. which was filed on Jun. 2, 2009, the contents of which are hereby incorporated herein by reference.

BACKGROUND

1. Technical Field

Aspects of this document relate generally to electrical boxes.

2. Background Art

Electrical boxes are conventionally used to mount and house one or more electrical devices within a wall or other structure. Such conventional electrical boxes typically consist of a generally box-shaped structure that is mounted to a wall stud or other interior wall structure via one or more nails, screws, or other fastening devices. An electrical box is typically a one-piece structure and contains an opening for an electrical device or connector which is typically installed within the box after the box is mounted within a wall.

SUMMARY

Aspects of this document relate to electrical boxes. In one aspect, an electrical box may comprise at least four walls extending forward from a back wall to an open front, at least two opposing walls of the four walls each comprising a track thereon, and at least two separate wall mount features each comprising a guide thereon directly and slidably coupled with the track of one of the at least two opposing walls so that when assembled the electrical box comprises a wall mount feature of the at least two separate wall mount features coupled to each of at least two opposing walls.

Particular implementations may comprise one or more of the following features. The wall mount features may each be a nail boss. The wall mount tracks may further comprise teeth configured to interact with corresponding structures located on the guides. The wall mount features may comprise at least two positions, a forward position and a rearward position. The electrical box may further comprise a locking mechanism configured to secure at least one wall mount feature in the rearward position. The locking mechanism may be a locking tab. The locking mechanism may also be a set screw.

In another aspect, an electrical box assembly may comprise at least four walls extending forward from a back wall to an open front, at least two opposing walls of the four walls each comprising a track extending therefrom, and at least one nail boss directly and slidably mounted to each track so that when assembled the electrical box comprises the at least one nail boss coupled to each of the at least two opposing walls.

In particular implementations, an electrical box assembly may comprise one or more of the following features. The tracks may further comprise teeth configured to interact with corresponding features located on the nail bosses. The nail bosses may each comprise at least two positions, a forward position and a rearward position. The electrical box assembly may further comprise a locking mechanism configured to secure at least one of the nail bosses in the rearward position. The locking mechanism may be a locking tab. The locking mechanism may be a set screw.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for an electrical box will become apparent for use with implementations of an electrical box from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical box.

Figure 1:
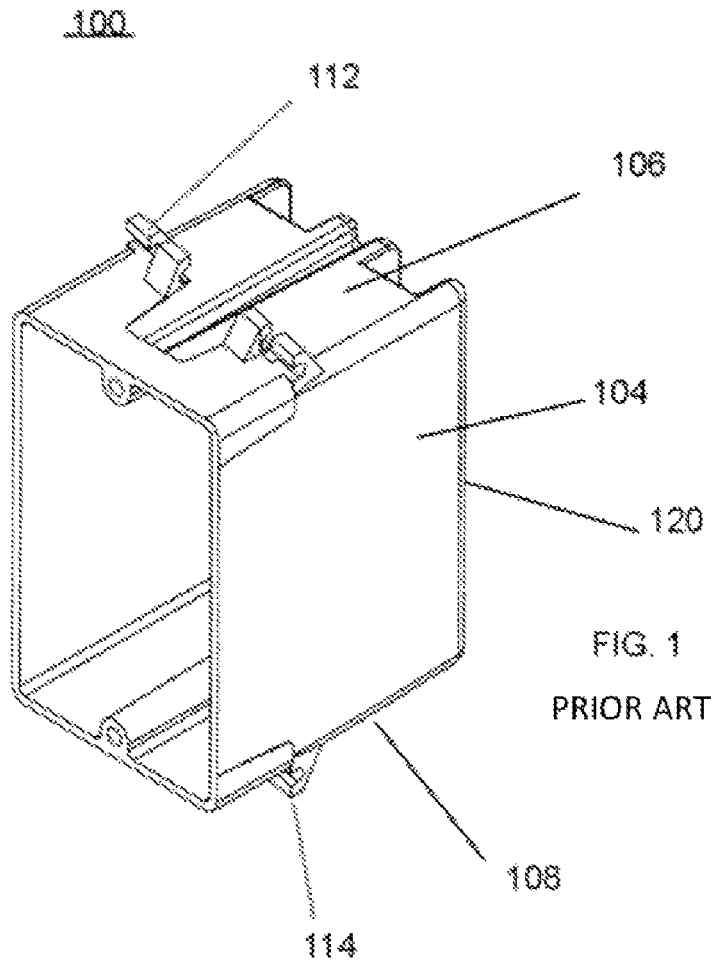
FIG. 1 is an isometric view of an electrical box of the prior art.

FIG. 1 shows an electrical box 100 of the prior art. Electrical box 100 comprises a back wall 120, a plurality of side walls 104, a top wall 106, a bottom wall 108, and at least one wall mount feature 112 and 114, mounted on top wall 106 and bottom wall 108, respectively. In FIG. 1, wall mount features 112 and 114 comprise nail bosses 112 and 114. In typical use electrical box 100 is mounted to a wooden or metal stud of other portion within a building wall using nail bosses 112 and 114. A worker would drive a nail through the nail bosses into the wooden or metal stud to mount the electrical box to the inside of the wall.

One problem of the electrical box shown in FIG. 1 is the transporting of electrical boxes. Another problem is the depth at which the electrical box is installed on the wall. Often, the wall covering material (i.e. drywall or wallboard or stucco) is a different thickness than anticipated by the electrical box installer. However, with a conventional box, once the wall covering material is installed on the wall it is too late to move the electrical box.

Figure 2:
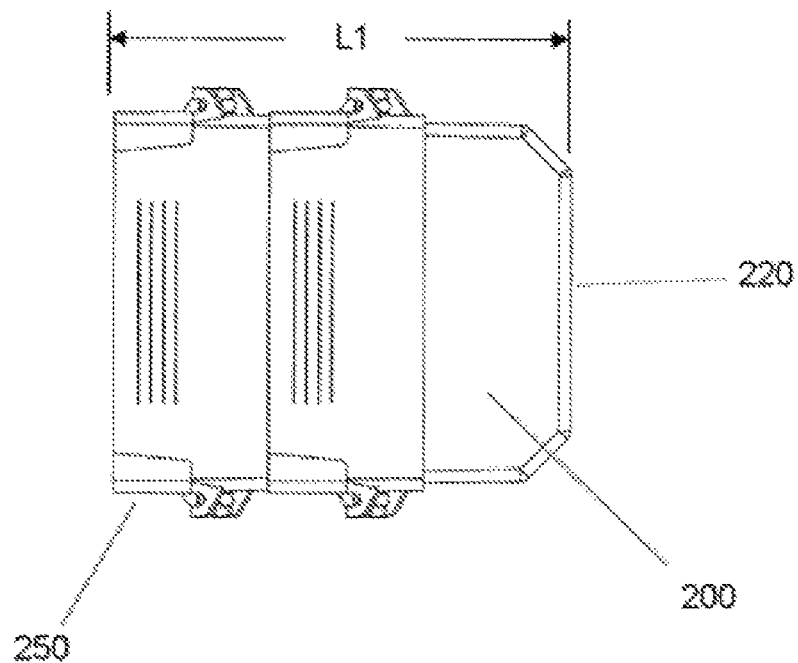
FIG. 2 is a side view of two stacked electrical boxes of the prior art.

As illustrated by the example FIG. 2, even with a nesting box, if one tries to nest electrical box 200 within electrical box 250, the depth of the nested boxes is of length L1, which is restricted by the nail bosses and ledge of electrical box 200, and the nail bosses and ledge of electrical box 250. In particular implementations, it is desired to have nested boxes where the back wall, such as back wall 220, fits into the front opening of another electrical box so that a greater density of electrical boxes can be realized for both transport and storage. In the same or other implementations it is desired to allow for adjustment of the installation depth of the electrical box after it is mounted to the wall.

Figure 3A:
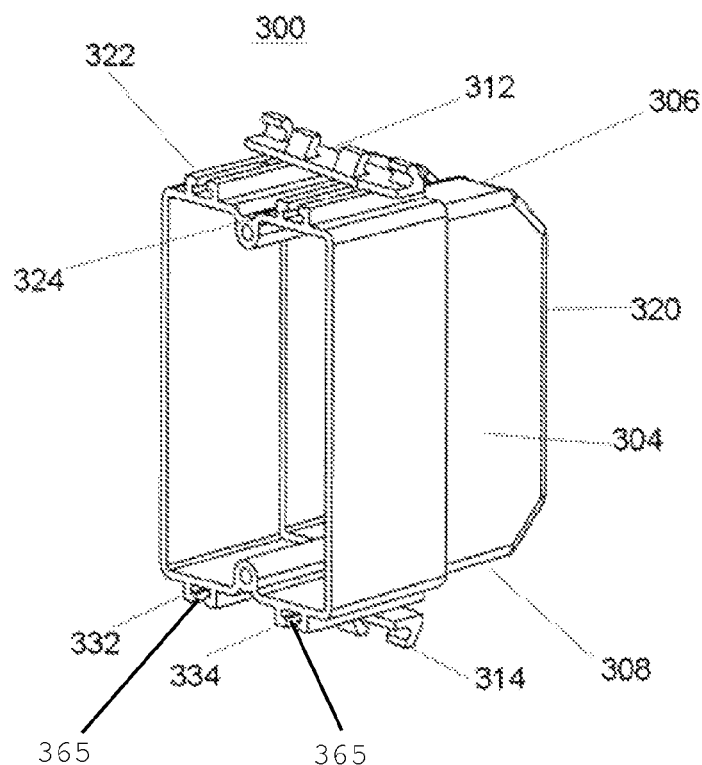
FIGS. 3A and 3B are isometric views of an embodiment of an electrical box of the present invention.
Figure 3B:
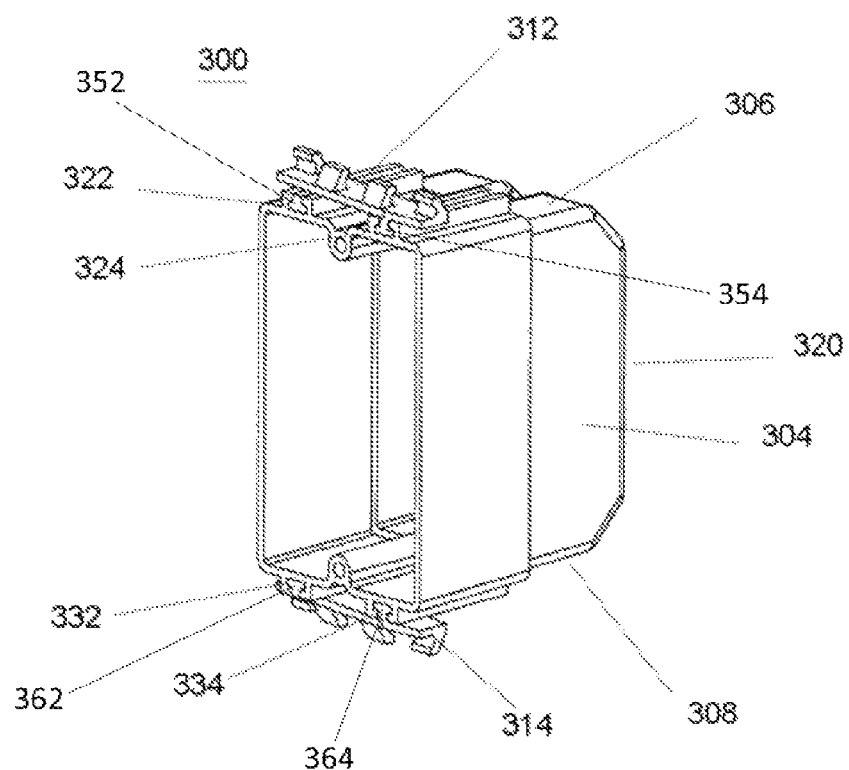

FIGS. 3A and 3B illustrate an electrical box 300 comprising a back wall 320, a plurality of side walls 304, a top wall 306, a bottom wall 308, and at least one wall mount feature 312 and 314. Wall mount features 312 and 314 are slidably mounted on top wall 306 and opposing bottom wall 308, respectively. FIG. 3A shows wall mount features 312 and 314 in the rearward most position. In typical installation, wall mount features 312 and 314 would be in the rearward most position shown in FIG. 3A. FIG. 3B shows wall mount features 312 and 314 in the forward-most position. This position would be used for storage and transport of electrical boxes. However, in particular installation scenarios where the wall covering materials are not the anticipated size or where a knot in a wooden wall stud prevents installation of the electrical box in the ideal location or where an installer is careless with the installation, an electrician can adjust the depth at which the electrical box is installed by sliding the electrical box forward or backward in relation to the wall and the wall mount features which are fixedly secured in their positions relative to the wall.

The slide mount between wall mount features 312 and 314 and side wall 304 may take any form known in the art. For the embodiments shown in FIGS. 3A and 3B, wall mount features 312 is slidably coupled to tracks 322 and 324, located on top wall 306. Wall mount feature 314 is slidably coupled to tracks 332 and 334, located on bottom wall 308. The tracks 332 and 334 may comprise a groove 365, channel, furrow, path, ledge, raised track, and/or the like and may be formed integrally or may be formed separately and thereafter coupled to the top wall 306. These tracks 332 and 334, or 322 and 324, may be in mechanical cooperation with one or more guides 362 and 364, or 352 and 354, that may be integrally formed with wall mount feature 314 or 312.

There may be a structure configured to lock wall mount features 312 and 314 to a desired position. Set screws or locking tabs may be included within tracks 332 and 334. Once wall mount features are at the desired position, one would use the screws or locking tabs to prevent further movement of wall mount features 312 and 314. If a locking tab is used, there may also be a hole or ledge also included on side wall 304. When the locking tab is to be used, the locking tab would interface with the hole or ledge, preventing further movement of wall mount features 312 and 314 when the locking tab is engaged.

Figure 4:
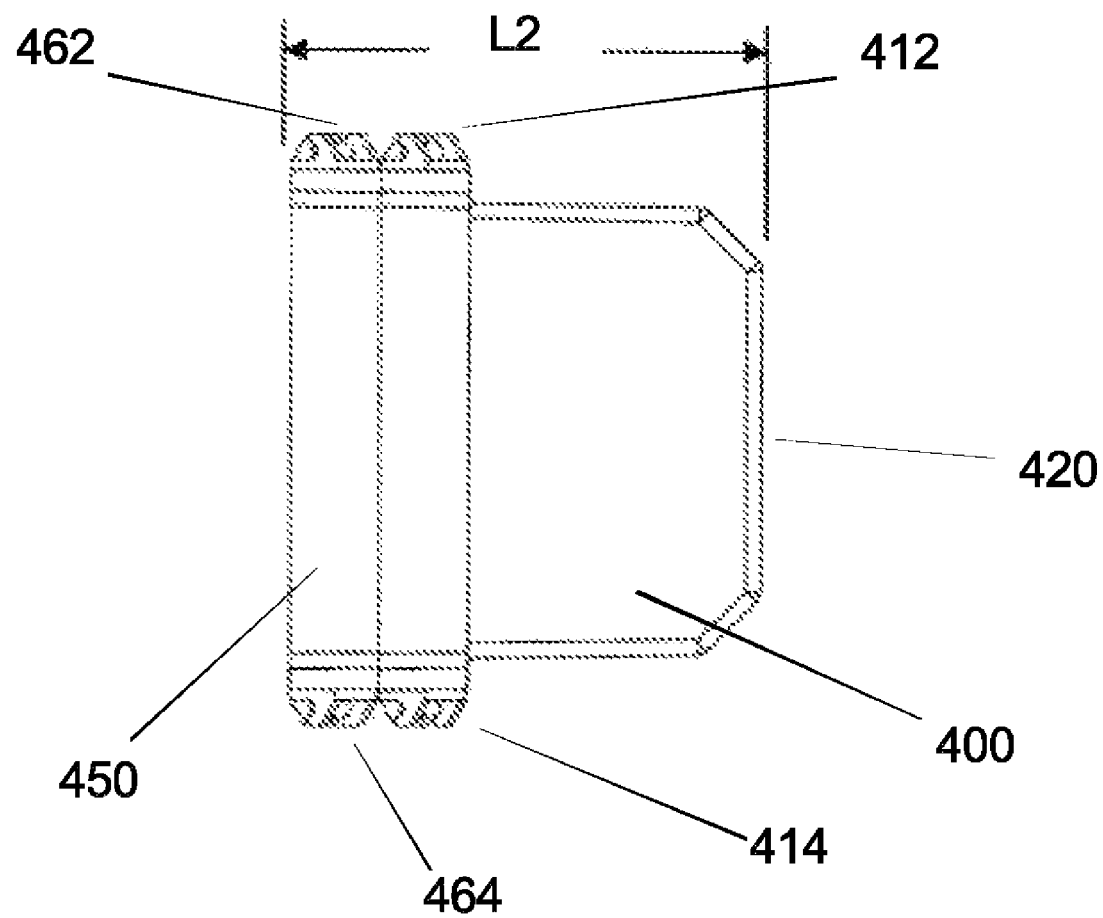
FIG. 4 is a side view of two stacked embodiments of electrical boxes of the present invention.

Referring to FIG. 4, two electrical boxes are shown nested together. Electrical box 410 is nested within electrical box 450. Because of the slidable arrangement of wall mount features 412 and 414 (of electrical box 400) and wall mount features 462 and 464 (of electrical box 450), electrical box 450 is able to nest deeper into electrical box 400 than the configuration shown in FIG. 2. The total depth of the two electrical boxes of length L2. It can be seen in comparison with FIG. 2, that depth L2 is smaller than depth L1 of FIG. 2. In this particular implementation, the guides of wall mount features 412, 414, 462 and 464 are mounted to recessed tracks on the walls of respective boxes 450 and 400 so as to not interfere with the stacking of the boxes. Thus, the shipping density of the electrical boxes of FIG. 4 is greater than the electrical boxes of FIG. 2. (Shipping density is measured in pounds per cubic feet and is inversely proportional to L1 and L2). In particular implementations, such as that illustrated in FIG. 4, the top wall mounting structure 412, 462 and the bottom wall mounting structure 414, 464 may be coupled together through a joining part so that the two wall mount features of each box are respectively coupled together and such that the two wall mounting structures are kept in respective alignment with each other throughout the range of movement along the wall of the box.

Figure 5A:
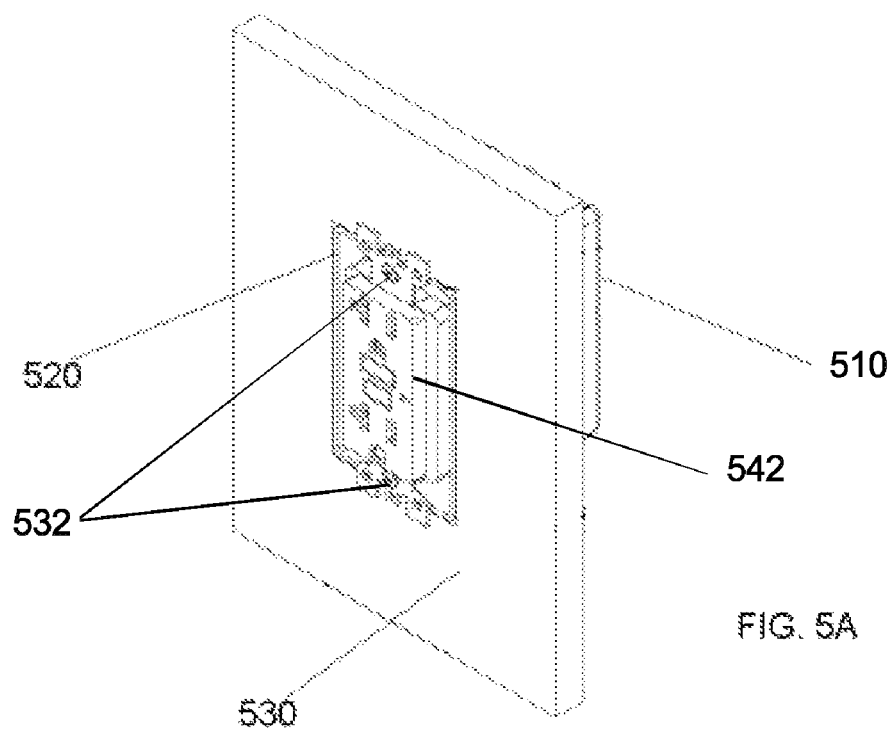
FIGS. 5A and 5B are isometric views of an electrical box installed in a wall.
Figure 5B:
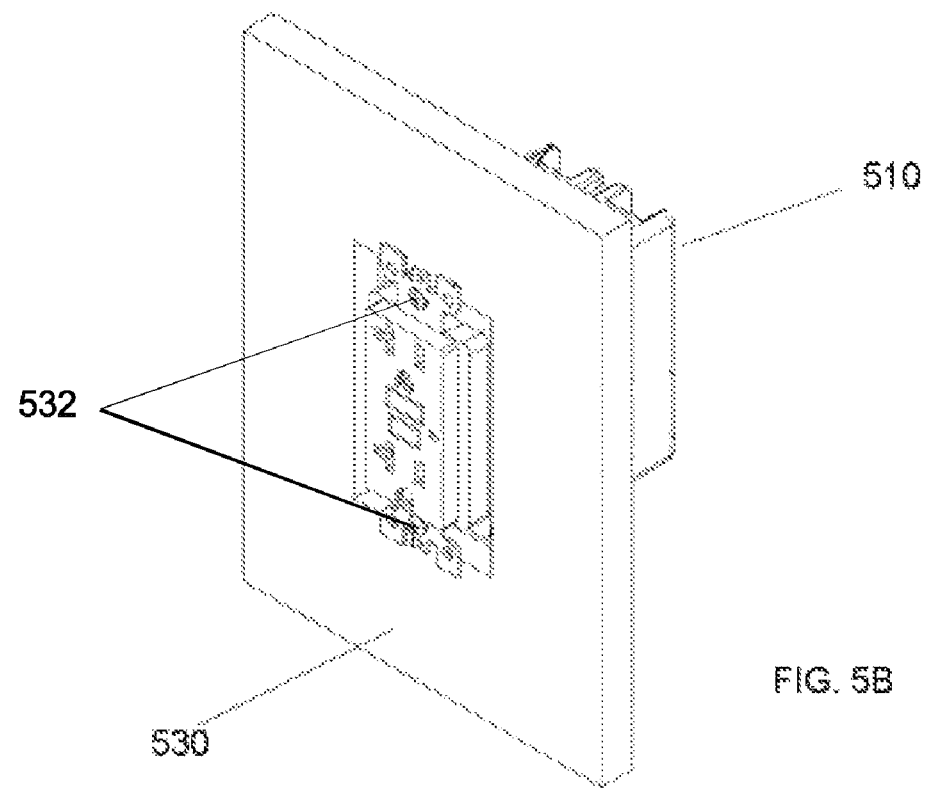

Another possible use of the movable mounting structure is to allow fine-tuning of the placement of the electrical box within the wall. As illustrated in FIG. 5A, in a typical installation, an electrical device (such as receptacle 542) is mounted in electrical box 510 via mounting screws 532. It is desirable for the electrical box 510 to be mounted such that the front face 520 of the electrical box is flush with the drywall face 530. However, if there was an error during the installation of the electrical box, the front face of the electrical box may be set back from the drywall, as shown in FIG. 5B, where the front face 520 of electrical box 510 is not even visible because electrical box 510 is set too far back from drywall face 530.

In accordance with one embodiment, after the electrical box is installed on a stud and the drywall installed, the position of the electrical box can be adjusted using the mounting screws. The screws that mount the faceplate to the electrical box can be used to pull the box toward the faceplate. In such a configuration, there may be teeth on the mounting structures that correspond to and can interact with raised ridges on the guides to lock the electrical box and the mounting structure together as the screws are tightened.

It will be understood that implementations are not limited to the specific components disclosed herein, as virtually any components consistent with the intended operation of a method and/or system implementation for an electrical box may be utilized. Accordingly, for example, it should be understood that, while the drawing figures accompanying text show and describe a rectangular electrical box, an electrical box of the present invention may contain any number of sides. Common electrical box shapes also include round, square, and octagonal. However, an electrical box of the present invention may also be other shapes. Components may comprise any shape, size, style, type, model, version, class, grade, measurement, concentration, material, weight, quantity, and/or the like consistent with the intended operation of a method and/or system implementation for an electrical box.

The concepts disclosed herein are not limited to the specific implementations shown herein. For example, it is specifically contemplated that the components included in a particular implementation of an electrical box may be formed of any of many different types of materials or combinations that can readily be formed into shaped objects and that are consistent with the intended operation of an electrical box. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the electrical box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical box, it should be readily apparent that a number of modifications may be made without departing from the spirit thereof and that these implementations may be applied to other electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical box comprising:
    at least four walls extending forward from a back wall to an open front, at least two opposing walls of the four walls each comprising a track groove thereon closed from exposure to an interior of the electrical box; and
    at least two separate wall mount features each comprising a guide thereon directly and slidably coupled with the track groove of different ones of the at least two opposing walls so that when assembled the electrical box comprises at least one wall mount feature of the at least two separate wall mount features coupled to each of at least two opposing walls.

2. The electrical box of claim 1 wherein the wall mount features are each a nail boss.

3. The electrical box of claim 1, wherein the wall mount features are positionable along the tracks between a forward position and a rearward position.

4. The electrical box of claim 3, wherein each track comprises an open end on a plane of the open front.

5. The electrical box of claim 4, wherein each track comprises a T-shaped groove and each guide comprises a T-shaped guide sized to fit within the T-shaped groove of each track.

6. An electrical box assembly comprising:
    at least four walls extending forward from a back wall to an open front, at least two opposing walls of the four walls each comprising at least one T-shaped track groove extending therefrom and closed from exposure to an interior of the electrical box; and
    at least one nail boss comprising a T-shaped guide directly and slidably mounted to each T-shaped track groove so that when assembled the electrical box comprises the at least one nail boss slidably coupled to each of the at least two opposing walls, and positionable along the T-shaped track grooves between a forward position and a rearward position.

7. The electrical box of claim 6, wherein each track comprises an open end on a plane of the open front.

\* \* \* \* \*